United States Patent
Smith et al.

(10) Patent No.: US 8,073,477 B2
(45) Date of Patent: ***Dec. 6, 2011

(54) SHORT MESSAGE DISTRIBUTION CENTER

(75) Inventors: Richard A. Smith, Annapolis, MD (US); Michael Dewey, Arnold, MD (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,700

(22) Filed: Aug. 16, 2010

(65) Prior Publication Data

US 2011/0047225 A1    Feb. 24, 2011

Related U.S. Application Data

(63) Continuation of application No. 09/832,010, filed on Apr. 11, 2001, now Pat. No. 7,809,382.

(60) Provisional application No. 60/169,097, filed on Apr. 11, 2000, provisional application No. 60/169,101, filed on Apr. 11, 2000.

(51) Int. Cl.
*H04W 4/12* (2009.01)

(52) U.S. Cl. .................. 455/466; 455/412.1; 455/461

(58) Field of Classification Search ............ 455/466, 455/461, 412.1, 412.2, 413, 414.1, 415, 432.3, 455/456.5, 463, 512–514

See application file for complete search history.

(56) References Cited

U.S. PATENT DOCUMENTS

| | | | |
|---|---|---|---|
| 1,103,073 A | 7/1914 | O'Connel | |
| 4,494,119 A | 1/1985 | Wimbush | |
| 4,651,156 A | 3/1987 | Martinez | |
| 4,706,275 A | 11/1987 | Kamil | |
| 4,891,638 A | 1/1990 | Davis | |
| 4,891,650 A | 1/1990 | Sheffer | |
| 4,952,928 A | 8/1990 | Carroll | |
| 5,014,206 A | 5/1991 | Scribner | |

(Continued)

FOREIGN PATENT DOCUMENTS

WO    WO97/41654    11/1997

OTHER PUBLICATIONS

Java-Centric Distributed Computing by Wollrath, A et al..; IEEE, vol. 17 Issue 3, May-June. 1997, pp. 44-53.

*Primary Examiner* — Pablo N Tran
(74) *Attorney, Agent, or Firm* — William H. Bollman

(57) ABSTRACT

A message distribution center (MDC) is interposed between content providers and a wireless carrier to subjectively examine and direct messages via SMTP based on desired rules (e.g., non-peak hours, paying subscribers only, etc.) using standard SMTP Gateway and other well-known protocols. The MDC includes an individual queue for each subscriber, and the provider is informed through conventional SMTP protocol messages that the short message has been accepted. If the carrier has specifically disallowed service for a particular MIN (e.g., in the case of churning), then the content provider is informed through an SMTP interchange that the recipient is invalid. An MDC provides a single mechanism for interacting with subscribers of multiple carriers, regardless of each carrier's underlying infrastructure. For the carrier, an MDC can protect their SS7 network by intelligently throttling messages and configuring message delivery parameters to be more network friendly. An MDC can receive outside a relevant wireless network recipient handset presence information. In the disclosed embodiment, a content provider communicates with the MDC using SMTP protocol messages, and the MDC communicates with wireless carriers preferably using RMI/SMPP techniques.

12 Claims, 3 Drawing Sheets

U.S. PATENT DOCUMENTS

| | | |
|---|---|---|
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,144,283 A | 9/1992 | Arens |
| 5,161,180 A | 11/1992 | Chavous |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,235,630 A | 8/1993 | Moody |
| 5,239,570 A | 8/1993 | Koster |
| 5,243,645 A | 9/1993 | Bissell et al. |
| 5,266,944 A | 11/1993 | Carroll |
| 5,289,527 A | 2/1994 | Tiedemann |
| 5,293,642 A | 3/1994 | Lo |
| 5,299,132 A | 3/1994 | Wortham |
| 5,325,302 A | 6/1994 | Izidon |
| 5,334,974 A | 8/1994 | Simms |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckert |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,418,835 A | 5/1995 | Froshman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama |
| 5,519,403 A | 5/1996 | Bickley |
| 5,530,918 A | 6/1996 | Jasinski |
| 5,532,690 A | 7/1996 | Hertel |
| 5,535,434 A | 7/1996 | Siddoway |
| 5,539,398 A | 7/1996 | Hall |
| 5,543,776 A | 8/1996 | L'esperance |
| 5,552,772 A | 9/1996 | Janky |
| 5,555,286 A | 9/1996 | Tendler |
| 5,568,119 A | 10/1996 | Schipper |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro |
| 5,606,313 A | 2/1997 | Allen |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,633,912 A | 5/1997 | Tsoi |
| 5,673,306 A | 9/1997 | Amadon |
| 5,682,600 A | 10/1997 | Salin |
| 5,692,037 A | 11/1997 | Friend |
| 5,694,546 A | 12/1997 | Reisman |
| 5,740,534 A | 4/1998 | Ayerst |
| 5,754,636 A | 5/1998 | Bayless |
| 5,754,946 A | 5/1998 | Cameron |
| 5,758,088 A | 5/1998 | Bezaire |
| 5,761,618 A | 6/1998 | Lynch |
| 5,767,795 A | 6/1998 | Schaphorst |
| 5,768,509 A | 6/1998 | Gunluk |
| 5,774,533 A | 6/1998 | Patel |
| 5,787,357 A | 7/1998 | Salin |
| 5,794,142 A | 8/1998 | Vanttila |
| 5,797,091 A | 8/1998 | Clise |
| 5,797,094 A | 8/1998 | Houde |
| 5,797,096 A | 8/1998 | Lupien |
| 5,802,492 A | 9/1998 | DeLorme |
| 5,806,000 A | 9/1998 | Vo |
| 5,822,700 A | 10/1998 | Hult |
| 5,828,740 A | 10/1998 | Khuc |
| 5,856,974 A | 1/1999 | Gervais |
| 5,903,726 A | 5/1999 | Donovan et al. |
| 5,905,736 A | 5/1999 | Ronen |
| 5,920,821 A | 7/1999 | Seazholtz |
| 5,930,701 A | 7/1999 | Skog |
| 5,940,756 A | 8/1999 | Sibecas |
| 5,943,399 A | 8/1999 | Bannister |
| 5,946,629 A | 8/1999 | Sawyer |
| 5,946,630 A | 8/1999 | Willars |
| 5,949,326 A | 9/1999 | Wicks et al. |
| 5,950,130 A | 9/1999 | Coursey |
| 5,953,398 A | 9/1999 | Hill |
| 5,959,543 A * | 9/1999 | LaPorta et al. ............... 340/7.23 |
| 5,960,074 A | 9/1999 | Clark |
| 5,963,864 A | 10/1999 | O'Neil |
| 5,966,663 A | 10/1999 | Gleason |
| 5,974,054 A | 10/1999 | Couts |
| 5,978,685 A | 11/1999 | Laiho |
| 5,987,323 A | 11/1999 | Huotari |
| 5,999,811 A | 12/1999 | Molne |
| 6,021,233 A | 2/2000 | Anderson |
| 6,023,470 A | 2/2000 | Lee |
| 6,035,025 A | 3/2000 | Hanson |
| 6,049,710 A | 4/2000 | Nilsson |
| 6,058,300 A | 5/2000 | Hanson |
| 6,064,875 A | 5/2000 | Morgan |
| 6,070,067 A | 5/2000 | Nguyen |
| 6,075,982 A | 6/2000 | Donovan |
| 6,078,583 A | 6/2000 | Takahara |
| 6,081,508 A | 6/2000 | West et al. |
| 6,094,574 A | 7/2000 | Vance |
| 6,101,378 A | 8/2000 | Barabash |
| 6,122,503 A | 9/2000 | Daly |
| 6,122,520 A | 9/2000 | Want |
| 6,134,432 A * | 10/2000 | Holmes et al. ............. 455/412.1 |
| 6,144,653 A | 11/2000 | Persson |
| 6,148,197 A | 11/2000 | Bridges |
| 6,148,198 A | 11/2000 | Anderson |
| 6,149,353 A | 11/2000 | Nilsson |
| 6,169,891 B1 | 1/2001 | Gorham |
| 6,173,181 B1 | 1/2001 | Losh |
| 6,175,922 B1 | 1/2001 | Wang |
| 6,178,331 B1 | 1/2001 | Holmes et al. |
| 6,181,935 B1 | 1/2001 | Gossman |
| 6,185,602 B1 | 2/2001 | Bayrakeri |
| 6,188,752 B1 | 2/2001 | Lesley |
| 6,189,031 B1 | 2/2001 | Badger et al. |
| 6,195,651 B1 | 2/2001 | Handel et al. |
| 6,198,431 B1 | 3/2001 | Gibson |
| 6,199,045 B1 | 3/2001 | Giniger |
| 6,205,330 B1 | 3/2001 | Winbladh |
| 6,208,854 B1 | 3/2001 | Roberts |
| 6,208,870 B1 | 3/2001 | Lorello |
| 6,216,008 B1 | 4/2001 | Lee |
| 6,223,042 B1 | 4/2001 | Raffel |
| 6,223,046 B1 | 4/2001 | Hamill-Keays et al. |
| 6,226,529 B1 | 5/2001 | Bruno |
| 6,244,758 B1 | 6/2001 | Solymar |

| Patent No. | Date | Name | | Patent No. | Date | Name |
|---|---|---|---|---|---|---|
| 6,249,680 B1 | 6/2001 | Wax | | 6,681,257 B1 | 1/2004 | Patel |
| 6,249,744 B1 | 6/2001 | Morita | | 6,718,178 B1 | 4/2004 | Sladek et al. |
| 6,263,212 B1 | 7/2001 | Ross et al. | | 6,725,268 B1 | 4/2004 | Jackel et al. |
| 6,263,372 B1 | 7/2001 | Hogan | | 6,757,708 B1 | 6/2004 | Craig et al. |
| 6,266,614 B1 | 7/2001 | Alumbaugh | | 6,771,971 B2 | 8/2004 | Smith |
| 6,289,095 B1 | 9/2001 | Buttitta | | 6,779,022 B1 | 8/2004 | Horstmann |
| 6,289,373 B1 | 9/2001 | Dezonno | | 6,785,659 B1 | 8/2004 | Landsman |
| 6,301,695 B1 | 10/2001 | Burnham | | 6,850,916 B1 | 2/2005 | Wang |
| 6,304,898 B1 | 10/2001 | Shiigi | | 6,856,804 B1 | 2/2005 | Ciotta |
| 6,311,055 B1 | 10/2001 | Boltz | | 6,886,017 B1 | 4/2005 | Jackson et al. |
| 6,314,108 B1 | 11/2001 | Ramasubramani | | 6,970,869 B1 | 11/2005 | Slaughter |
| 6,317,594 B1 | 11/2001 | Gossman | | 6,993,325 B1 | 1/2006 | Waesterlid |
| 6,327,479 B1 | 12/2001 | Mikkola | | 7,010,303 B2 * | 3/2006 | Lewis et al. .................. 455/445 |
| 6,353,614 B1 | 3/2002 | Borella et al. | | 7,039,037 B2 * | 5/2006 | Wang et al. .................. 370/349 |
| 6,366,663 B1 | 4/2002 | Bauer | | 7,058,036 B1 | 6/2006 | Yu et al. |
| 6,366,961 B1 | 4/2002 | Subbiah et al. | | 7,069,439 B1 | 6/2006 | Chen |
| 6,370,373 B1 | 4/2002 | Gerth | | 7,154,901 B2 | 12/2006 | Chava et al. |
| 6,389,421 B1 | 5/2002 | Hawkins et al. | | 7,171,190 B2 | 1/2007 | Ye |
| 6,389,455 B1 | 5/2002 | Fuisz | | 7,181,538 B2 | 2/2007 | Tam et al. |
| 6,393,014 B1 | 5/2002 | Daly | | 7,197,661 B1 | 3/2007 | Reynolds |
| 6,393,461 B1 | 5/2002 | Okada et al. | | 7,224,696 B2 | 5/2007 | Bouleros |
| 6,396,913 B1 | 5/2002 | Perkins | | 7,480,915 B2 | 1/2009 | Costa Requena |
| 6,397,054 B1 | 5/2002 | Hoirup et al. | | 7,486,641 B2 | 2/2009 | Reddy |
| 6,408,177 B1 | 6/2002 | Parikh et al. | | 7,509,136 B2 * | 3/2009 | Hart et al. .................. 455/466 |
| 6,421,733 B1 | 7/2002 | Tso | | 7,519,654 B1 * | 4/2009 | Smith et al. .................. 709/203 |
| 6,424,841 B1 | 7/2002 | Gustafsson | | 7,627,305 B2 * | 12/2009 | Helferich .................. 455/403 |
| 6,442,589 B1 | 8/2002 | Takahashi | | 7,809,382 B2 | 10/2010 | Smith |
| 6,446,112 B1 | 9/2002 | Bunney | | 7,860,068 B2 | 12/2010 | Smith |
| 6,446,969 B1 | 9/2002 | Denoual | | 2001/0031641 A1 | 10/2001 | Ung |
| 6,456,852 B2 | 9/2002 | Bar | | 2001/0032267 A1 | 10/2001 | Collison |
| 6,459,892 B2 | 10/2002 | Burgan | | 2001/0034224 A1 | 10/2001 | McDowell |
| 6,463,145 B1 | 10/2002 | O'neal | | 2001/0041579 A1 | 11/2001 | Smith et al. |
| 6,487,180 B1 | 11/2002 | Borgstahl | | 2002/0052968 A1 | 5/2002 | Bonefas et al. |
| 6,493,430 B2 * | 12/2002 | Leuca et al. .................. 379/88.12 | | 2002/0091789 A1 | 7/2002 | Katariya |
| 6,493,558 B1 | 12/2002 | Bernhart | | 2002/0133568 A1 | 9/2002 | Smith |
| 6,499,053 B1 | 12/2002 | Marquette et al. | | 2003/0092454 A1 * | 5/2003 | Halim et al. .................. 455/466 |
| 6,502,086 B2 | 12/2002 | Pratt | | 2003/0105864 A1 | 6/2003 | Mulligan |
| 6,505,046 B1 | 1/2003 | Baker | | 2004/0196858 A1 | 10/2004 | Tsai |
| 6,507,589 B1 | 1/2003 | Ramasubramani et al. | | 2005/0004968 A1 | 1/2005 | Mononen |
| 6,512,930 B2 | 1/2003 | Sandegren | | 2005/0064884 A1 | 3/2005 | Dumont |
| 6,538,561 B2 | 3/2003 | Angus | | 2005/0076084 A1 | 4/2005 | Loughmiller |
| 6,560,456 B1 | 5/2003 | Lohtia | | 2005/0078660 A1 | 4/2005 | Wood |
| 6,564,261 B1 | 5/2003 | Gudjonsson et al. | | 2005/0132060 A1 | 6/2005 | Mo |
| 6,567,979 B1 | 5/2003 | deCarmo | | 2005/0141522 A1 | 6/2005 | Kadar et al. |
| 6,587,691 B1 | 7/2003 | Granstam | | 2005/0164721 A1 | 7/2005 | Yeh |
| 6,591,304 B1 | 7/2003 | Sitaraman et al. | | 2005/0176409 A1 | 8/2005 | Carpenter |
| 6,654,786 B1 | 11/2003 | Fox | | 2005/0186974 A1 | 8/2005 | Cai |
| 6,658,260 B2 | 12/2003 | Knotts | | 2006/0053197 A1 | 3/2006 | Yoshimura et al. |
| 6,662,015 B2 | 12/2003 | Furlong | | 2006/0194595 A1 | 8/2006 | Myllynen |
| 6,667,688 B1 | 12/2003 | Menard | | 2010/0257241 A1 * | 10/2010 | Hale et al. .................. 709/206 |
| 6,671,356 B2 | 12/2003 | Lewis | | | | |
| 6,674,767 B1 | 1/2004 | Kadyk | | | | |

* cited by examiner

SHORT MESSAGE DISTRIBUTION CENTER

The present application is a continuation of U.S. application Ser. No. 09/832,010, entitled "Short Message Distribution Center", filed on Apr. 11, 2001 now U.S. Pat. No. 7,809,382; which in turn is claims priority from U.S. Provisional Application No. 60/169,097, entitled "Message Distribution Center", filed Apr. 11, 2000, and U.S. Provisional Application No. 60/169,101, entitled "Management Messaging Middleware," filed Apr. 11, 2000, the entirety of all three of which are expressly incorporated herein by reference.

BACKGROUND OF THE INVENTION

1. Field of the Invention

This invention relates generally to wireless carriers, Internet service providers (ISPs), and information content delivery services/providers. More particularly, it relates to Wireless Telecommunication, ANSI-41D Wireless Intelligent Network (WIN) applications, and SMTP protocol to manage information content for a wireless carrier.

2. Background of Related Art

There are many "wireless" information content providers in the industry who have some information or service that is considered of value to the mobile phone user. Wireless Carriers are typically in favor of these content providers as they add value to Short Messaging Systems (SMS) and can drive up SMS and voice usage.

Unfortunately, content providers may not fully understand a particular wireless network and/or may not be fully sensitized to particular needs of carriers. This is because the carrier is often seen simply as a 'pipe' through which wireless messages are sent using SMTP protocol. Content providers maintain their own subscriber lists, and typically communicate with carriers merely as e-mail hosts.

All traffic is typically sent through an SMTP gateway, and thus information content, ads, etc., cannot be differentiated from higher priority 'personal' content. Problems arising from this include:

- Bulk information content can slow down and even jeopardize the carrier's SMTP Gateway performance;
- Personal messages cannot be given a higher priority than bulk messages;
- Bulk info content receives the same messaging parameters as personal messages, e.g., delivery receipts enabled, expiration date of 3-5 days, etc.;
- The carrier cannot differentiate between bulk messages among various providers and personal mail for billing purposes;
- Bulk senders deliver their content regardless of whether the device is on, and thus the carrier must handle message storage and retry attempts; and
- Bulk senders will typically continue to deliver content to churned wireless subscribers, wasting network resources and interfering with reuse of mobile numbers.

There is a need for a technique using SMTP and/or other conventional protocols to enable an easy way for content providers to distribute and/or differentiate their information without requiring them to change technologies.

BRIEF DESCRIPTION OF THE DRAWINGS

Features and advantages of the present invention will become apparent to those skilled in the art from the following description with reference to the drawings, in which.

SUMMARY OF THE INVENTION

Figure 1:
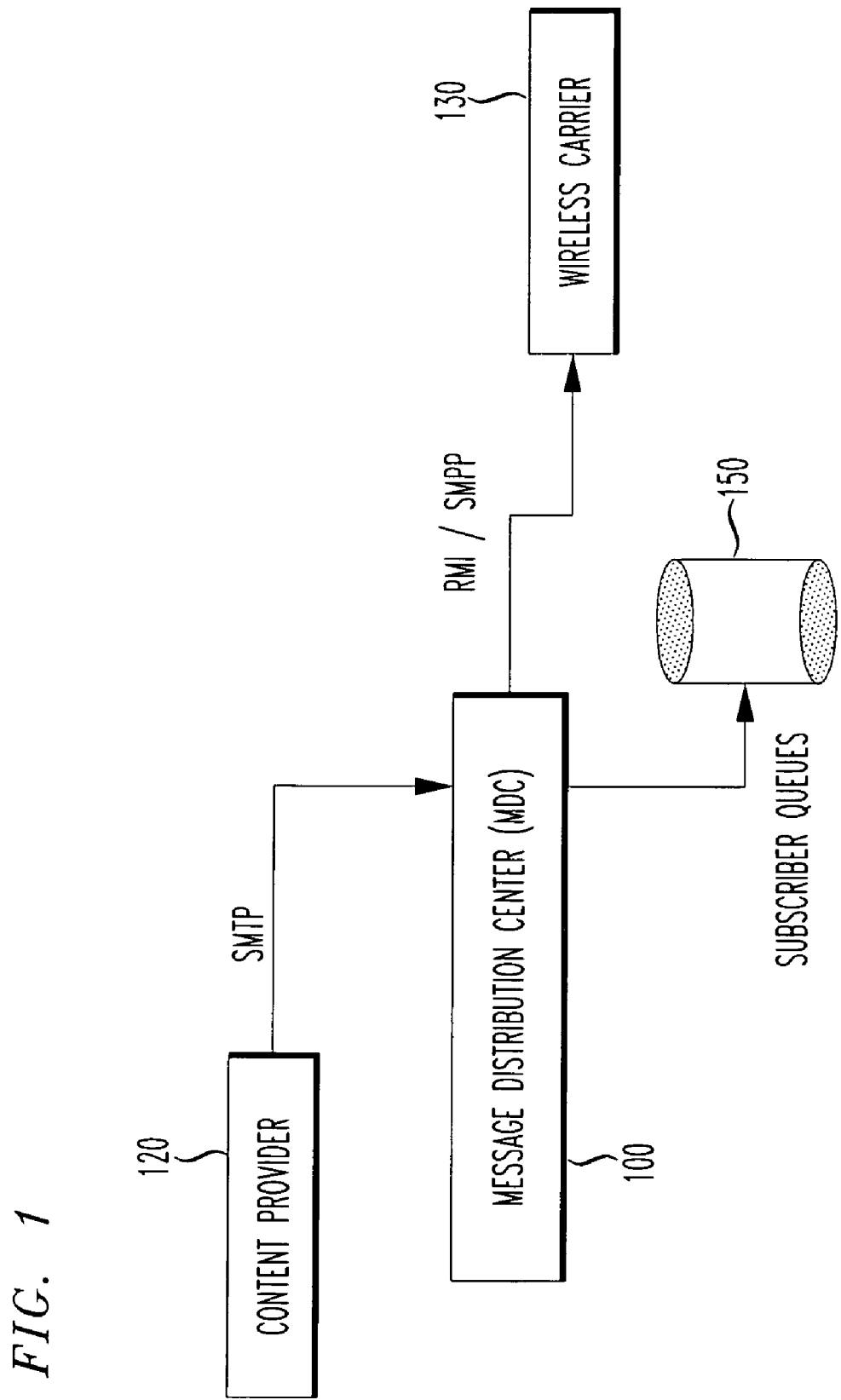
FIG. 1 shows a high level sequence diagram including a Message Distribution Center (MDC) enabling a Content Provider to direct messages via SMTP to the Message Distribution Center (MDC), in accordance with the principles of the present invention.

In accordance with the principles of the present invention, a message distribution center is interposed between a source of a short message and a wireless network including an intended recipient of the short message. The message distribution center comprises an SMTP protocol communication channel to receive the short message from the source of the short message. A plurality of subscriber queues are included, each corresponding to a different subscriber in the wireless network. The short message is placed in at least one of the plurality of subscriber queues before delivery to the wireless network. A communication channel communicates the short message to the wireless network.

In accordance with another aspect of the present invention, a method of throttling short messages to subscribers in a wireless network comprises forwarding a short message to a wireless network only when a receiving wireless device in said wireless network is known outside said wireless network to be online.

DETAILED DESCRIPTION OF ILLUSTRATIVE EMBODIMENTS

The present invention enables a Content Provider to direct messages via SMTP to an intermediatary Message Distribution Center (MDC) using standard SMTP Gateway and other well-known protocols.

In accordance with the principles of the present invention, short messages are inserted in the MDC into individual queues for each subscriber, and the provider is informed through conventional SMTP protocol messages that the short message has been accepted.

If the carrier has specifically disallowed service for a MIN (e.g., in the case of churning), then the content provider is informed through an SMTP interchange that the recipient is invalid. This encourages providers to discontinue service to terminated MINs, thereby reducing traffic to the MDC.

A Message Distribution Center (MDC) provides value to both wireless developers and wireless carriers. For instance, for the Wireless Developer, an MDC provides a single mechanism for interacting with subscribers of multiple carriers, regardless of each carrier's underlying infrastructure. For the carrier, an MDC can protect their SS7 network by intelligently throttling messages and configuring message delivery parameters to be more network friendly.

An MDC acts as a broker between carriers and developers. Different levels of relationships can be established with both carriers and developers, resulting in different levels of services that are available. The MDC interacts with a carrier's Short Message Service Center(s) (SMSCs) and/or SS7 network, allowing developers to guarantee message delivery, to interact with users via Mobile Terminated (MT) and Mobile Originated (MO) SMS, and possibly even to receive handset presence information.

Although the disclosed embodiments relate primarily to wireless services from the perspective of a Short Message Service (SMS), the disclosed MDC and related management middleware may support many types of wireless devices using the same API. For instance, suitable supported devices may include, e.g., 2-way Email pagers, the Palm VII™, and wireless application protocol (WAP) devices.

The disclosed MDC utilizes a Wireless Internet Gateway (WIG), which is a middleware messaging platform designed to facilitate communication between Internet devices and various wireless networks. A suitable WIG is disclosed in U.S. application Ser. No. 09/630,762 to SMITH, entitled "Wireless Internet Gateway", filed Aug. 2, 2000, the entirety of which is expressly incorporated herein by reference.

FIG. 1 shows a high level sequence diagram including a Message Distribution Center (MDC) enabling a Content Provider to direct messages via SMTP to the Message Distribution Center (MDC), in accordance with the principles of the present invention.

In particular, as shown, in FIG. 1, an MDC 100 is placed intermediary between a content provider 120 and a wireless carrier 130, to allow management of message delivery for each of a plurality of subscribers. As shown in FIG. 1, the content provider 120 communicates with the MDC 100 using SMTP protocol messages, and the MDC communicates with the wireless carrier 130 preferably using RMI/SMPP techniques.

Importantly, the MDC 100 includes a plurality of subscriber queues 150, preferably one for each subscriber having MDC support. The subscriber queues 150 may be integrated within the gateway of the MDC 100, or may be external to the gateway of the MDC 100 but nevertheless in direct communication with the gateway of the MDC 100.

The subscriber queue 150 preferably follows a First In First Out (FIFO) model, where the oldest messages are delivered first.

In accordance with the principles of the present invention, a particular wireless carrier 130 assigns a value for the maximum number of outstanding messages for a particular subscriber. This maximum number of outstanding messages can be used to establish a queue threshold. Thus, if one or more new messages cause the queue threshold to be exceeded, then the oldest messages may be deleted first from the particular subscriber queue 150 to make room for the new message(s). Of course, the subscriber queue 150 may be expanded in size as desired.

To provide protection from constantly growing subscriber queues 150, other rules may be established by the wireless carrier 130 to allow automatic deletion of particular messages from the subscriber queue 150.

For instance, an expiration period may be established whereby all messages more than x days old are removed. The expiration period may be established, e.g., on an individual subscriber basis (e.g., different subscription plans allowing larger queues and/or longer storage times), or on a global basis (e.g., all subscribers in a particular wireless network have a similar expiration time).

The use of automatic deletion of short messages from subscriber queues 150 is important, e.g., in the case of churned MINs, so that a new subscriber does not receive lingering messages from a previous subscriber with the same MIN.

Short messages to subscriber queues 150 may be delivered independently from one another and/or message delivery times spaced apart, thereby distributing message load over time and minimizing the negative effects of batch messaging on the wireless network.

The MDC 100 can also or alternatively be configured to avoid sending batch messages during the carrier's busy hour(s), thereby minimizing load pressures on the wireless network.

The use of an MDC 150 can aid the wireless carrier's network significantly, e.g., by forwarding short messages only when the relative handsets are turned on. Under this scenario, subscriber queues are not processed when the handset is powered off. This can reduce network storage requirements, delivery retry attempts, and overall SS7 usage. The MDC 100 can do this either by interacting with appropriate applications, e.g., with a mobile chat location register (MCLR), or generally by intelligent use of SMS delivery receipt data from the SMSC and Web Gateway. A suitable mobile chat location register (MCLR) is shown and described in U.S. application Ser. No. 09/814,363, entitled "Wireless Chat Automatic Status Tracking", filed Mar. 23, 2001 by Ung et al., the entirety of which is expressly incorporated herein by reference.

The MDC 100 can further be configured to send content from various providers to certain SMPP ports on a short message service center (SMSC). The receipt of such content allows distinct billing records to be generated for each type of service, e.g., ads, general content, premium content, etc.

Figure 2:
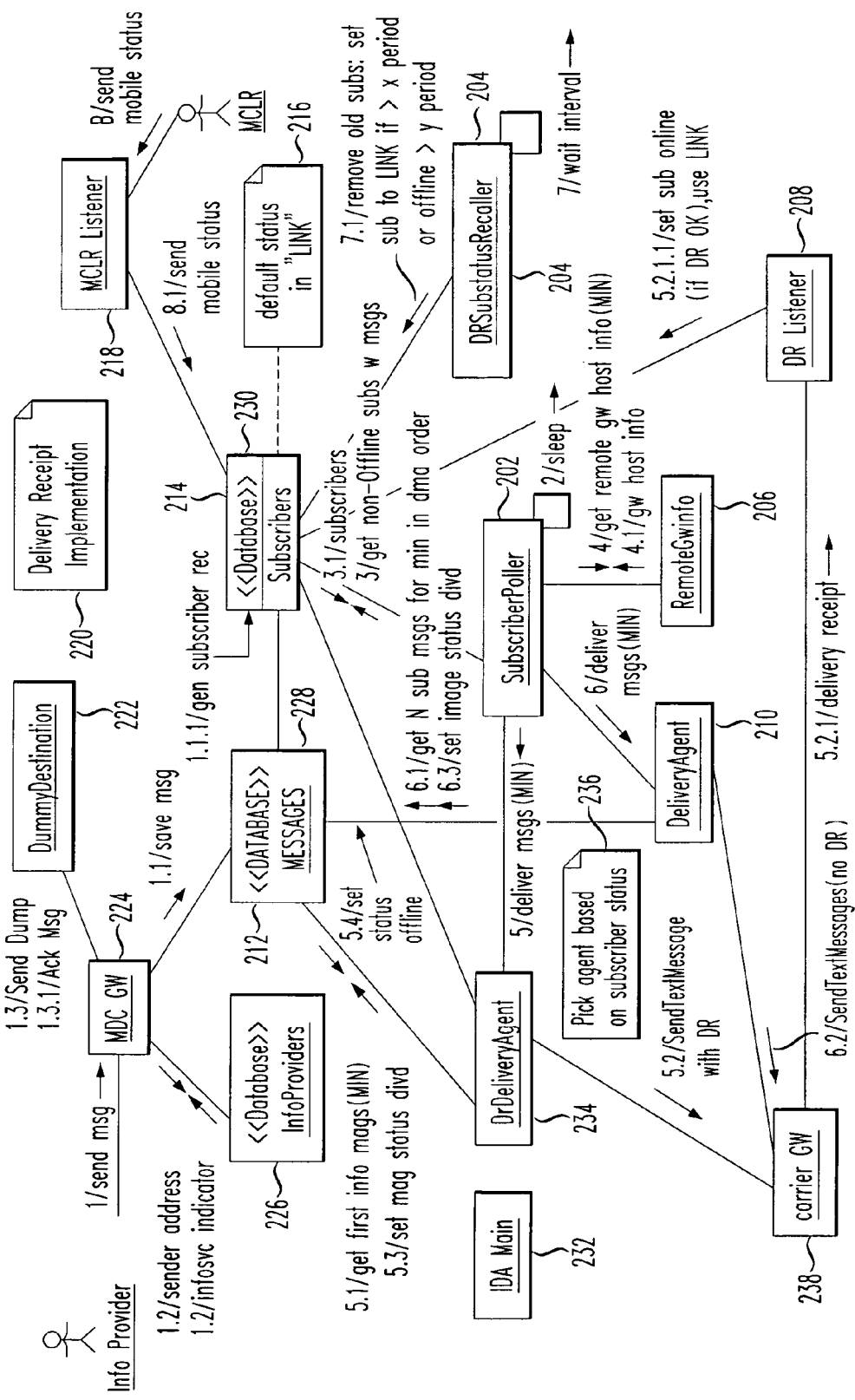
FIG. 2 illustrates exemplary software components and their relationships in an embodiment of a message distribution center (MDC), in accordance with one embodiment of the present invention.

FIG. 2 illustrates exemplary software components and their relationships in an embodiment of a message distribution center (MDC), in accordance with one embodiment of the present invention.

In the disclosed embodiments, a Wireless Internet Gateway (WIG) was modified to include another 'dev/null' destination, which acknowledges short messages from a queueMonitor, but does not actually process them. The short messages remain in the Messages table of the database, where they are retrieved by a software component referred to herein as an "Intelligent Delivery Agent" (IDA). The IDA retrieves messages from the Messages table in the database for subscribers, e.g., when they power on their handsets, subject to any desired rules. The IDA can become aware of subscriber power-ups through any appropriate trigger, e.g., via an SMPP Delivery Receipt mechanism, through Mobile Chat Location Register (MCLR) software, etc. Preferably, the IDA throttles short message traffic to any or all subscribers, e.g., optionally waiting until the busy hour is over before beginning the transmission.

The MDC Gateway 100 may be, e.g., a standard WIG to which the provider sends messages through SMTP, RMI, HTTP, or suitable middleware software. As shown in FIG. 2, the MDC 100 includes a new DummyDestination, which simply acknowledges receipt from a particular subscriber queue 150, but does not attempt delivery. Delivery may be accomplished through an Intelligent Delivery Agent process, which polls a messages table that is populated when the MDC Gateway 100 receives relevant short messages.

To most efficiently use the MDC gateway 100, the SMTP session preferably assigns the msgType property based on the sender's Email address and using InfoProviders information from the database. This allows the MDC Gateway 100 to determine that SMTP messages from an Information Provider (e.g., INFO@NEWS.COM) should use the Dummy Destination and be queried by the IDA. If the short message is submitted via an RMI mechanism, then the sender will explicitly define the msgType.

When the MDC 100 inserts a short message record, an Oracle™ trigger may be used to create a subscriber record in the Subscribers table in the database if such a record does not already exist for the recipient.

The Subscribers table may contain, preferably at a minimum, a MIN, status (e.g., 'Online', 'Offline', 'Unknown'), and the time of the last status update. When first created, the status may default to 'Unknown'.

The IDA may be a separate program that delivers messages from the database to appropriate recipients via a RemoteSMPP RMI Interface of the carrier's gateway. The IDA preferably determines subscriber availability via, e.g., an MCLR or via Delivery Receipts. The former approach is likely more efficient, but the latter approach is more likely to work with most carrier environments.

The Delivery Receipt method is considered to be more complicated. The Delivery Receipt method attempts to find the status of a subscriber's handset by examining delivery receipts from messages sent to the subscriber.

As shown in FIG. 2, a SubscriberPoller agent 202 starts the process by gathering a list of subscribers from a Subscribers table 214 at some time interval (z). If a particular subscriber is online, then the DeliveryAgent object 210 is notified.

The DeliveryAgent 210 then gathers some pre-configured number of messages in time order for the subscriber from the Messages table 228 in the database, and sends them to the Carrier gateway 238 for delivery to the subscriber. There is no delivery receipt associated with these messages, so if the subscriber's handset is turned off the short messages are not delivered and not resent. This is why it is preferred that only a pre-configured number of short messages be sent before the subscriber's status is checked again by SubscriberPoller 202.

If a subscriber's status is unknown, then a DRDeliverAgent 234 is notified to send one message via the Carrier gateway 238 to the subscriber with a delivery receipt requested. When it sends the message, it sets the subscriber status as offline so that the SubscriberPoller 202 will ignore that subscriber.

The delivery receipt will arrive at DR Listener 208. If the delivery receipt indicates failure, then the subscriber status is reset as 'unknown', otherwise the subscriber status is set as 'online'. The SubscriberPoller 202 wakes up shortly thereafter to take advantage of the user going online.

Because there is no direct feedback from the handset, there is no conventional information received when a handset is turned off or on. DBSubStatusResetter 204 makes assumptions about how long a handset typically stays on or goes off. If a handset has been marked as online for a period of time (x), then DRSubStatusResetter 204 sets the corresponding subscriber status to 'unknown', which will restart the delivery receipt cycle again. If a subscriber has been marked as 'offline' for a different period of time (y), then the subscriber is marked as unknown, again restarting the delivery receipt cycle.

To summarize, there are three time periods involved in the Delivery Receipt method. Time x is the average time that a handset is online. Time y is the average time that a handset is offline. Time z is how often the Subscribers table 214 is polled for a list of subscribers.

The three periods mentioned (x, y, and z) must have a certain relationship to one another. Time z must be smaller than time x and time y. Time x and time y's relationship to one another doesn't matter. Time z must be smaller than time x so that when a subscriber goes online, messages are sent to it before time x expires and online subscribers are set to 'unknown'. Time z should be smaller than time y, otherwise the subscriber will be sent another message before DR Listener 208 has had a chance to receive the delivery receipt. This implies that time z will also be longer than the expected time for a delivery receipt.

A SubscriberCleanUp agent may be implemented to clean out subscribers that haven't had messages sent to them for a pre-defined period of time. This will ensure that the subscriber database doesn't grow without bound. Subscribers may have taken their name from the information provider's subscriber list.

Another technique mentioned above is to use an MCLR facility. In this situation, the MCLR will know explicitly when a handset is turned off or on. The MCLR Listener 218 then updates the Subscribers table 214 accordingly. The SubscriberPoller 202 always sees only online subscribers. It then uses the DeliveryAgent 210 to send the messages without a delivery receipt requested.

When the MCLR Listener 218 active, then the DRDeliverAgent 234, DR Listener 208, and DBSubStatusResetter 204 are all inactive. When the three delivery receipt entities are active, then the MCLR Listener 218 is inactive.

The IDA Main 232 activates appropriate facilities based on a configuration file.

In an MCLR implementation, the DRDeliveryAgent 234, DR Listener 208, and DRSubStatusResetter 204 may not be used.

Figure 3:
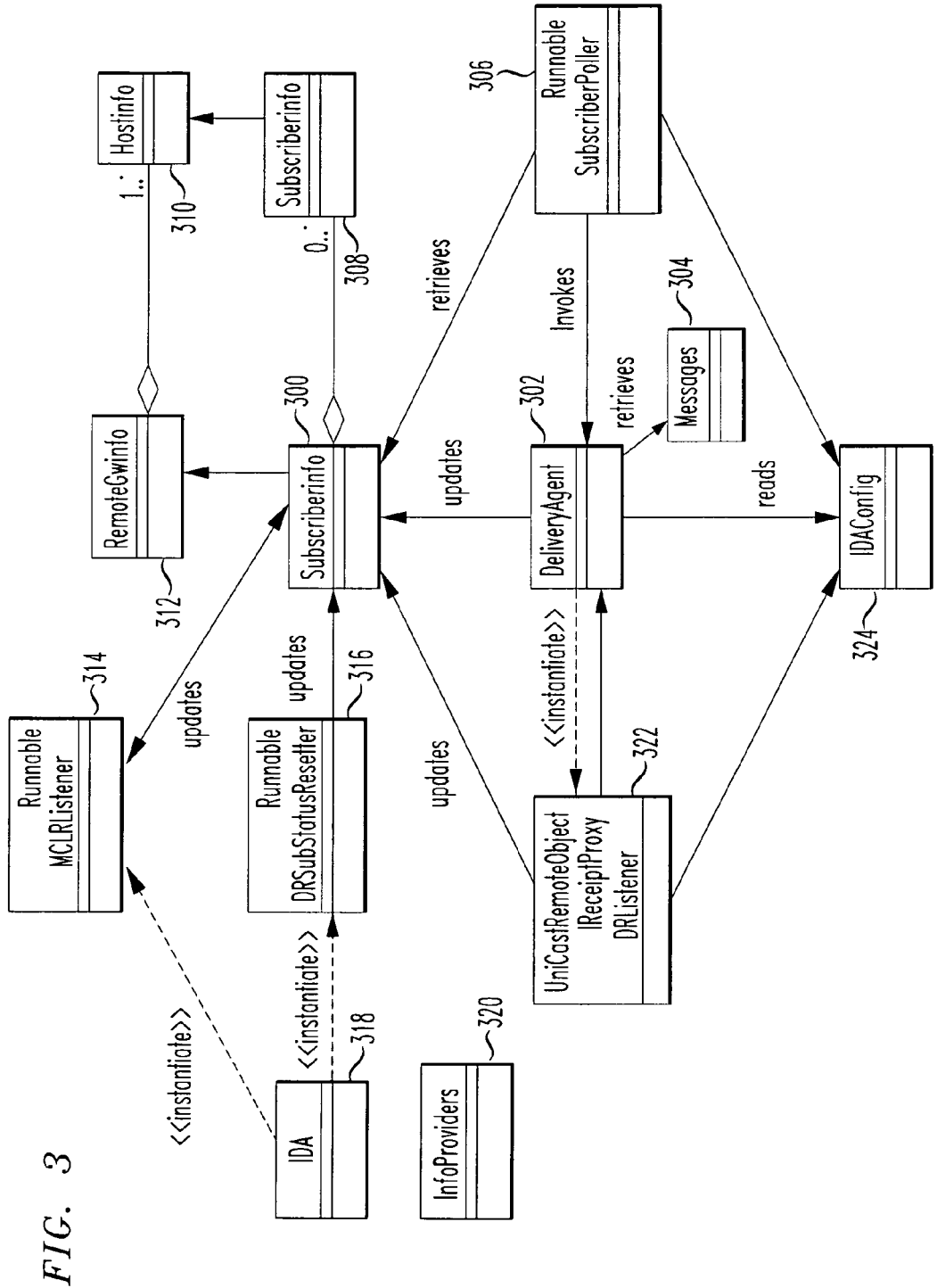
FIG. 3 is an exemplary class diagram which shows further details of an embodiment of a Message Distribution Center, in accordance with the principles of the present invention.

FIG. 3 is an exemplary class diagram which shows further details of an embodiment of a Message Distribution Center, in accordance with the principles of the present invention. In particular, FIG. 3 shows exemplary classes that may be activated and used to determine subscriber status and to actually deliver messages.

As shown in FIG. 3, an IDA main class 318 is responsible for deciding which subscriber status determination strategy to use. The IDA class 318 may receive this information from a configuration file. The IDA class 318 instantiates and activates an MCLRListener class 314 if that facility is to be used to retrieve a handset's online/offline status. If the strategy is to use delivery receipts, then the IDA class 318 instead instantiates and activates the DRListener 322 and DRSubStatusResetter 316 classes.

A SubscriberPoller 306 class gets a list of subscribers whose status is 'unknown' or 'online' from the database. If a subscriber's status is 'unknown', the SubscriberPoller 306 invokes a method in a DeliveryAgent class 302 to send a message requesting a delivery receipt. If the subscriber's status is 'online', then the DeliveryAgent 302 sends messages without a delivery receipt to the subscriber.

The DeliveryAgent 302 is responsible for averaging out the load on the carrier's system. It may do this by spreading out the messages over time, allowing normal traffic to be sent more quickly. The DeliveryAgent 302 may also hold off sending batch messages during the carrier's busy time. This information may be maintained in a configuration file and retrieved through a DeliverySetupInfo class.

The DeliveryAgent 302 can also be configured to send messages over certain SMPP ports to the carrier gateway 238 for tracking the amount of traffic that an information provider is sending. The DeliveryAgent 302 may accomplish this by tagging the message with a message type indicating that it is an MDC message. The configuration file may be set up so that messages of an MDC type will be sent to certain SMPP ports by the carrier gateway 238.

Both the Subscribers 300 and Messages 304 classes may be wrappers around their respective database tables, to isolate JDBC calls to these classes only and/or to place the data in a useful format.

The IDA 318 may send messages and/or decide blackout periods on a global basis, i.e., regardless of the destination of any particular message. One enhancement to this is to apply these on a per-carrier basis since carriers can be in different time zones or have more or less capable hardware.

One advantage provided by the present invention is that SMTP is a well-known protocol and an easy way for content providers to distribute their information.

A Message Distribution Center (MDC) in accordance with the principles of the present invention provides an ideal solution. It addresses the problems faced by the carrier without requiring the information providers to change technologies.

The principles of the present invention have applicability for usage with wireless intelligent network (WIN) and SMTP applications, e.g., those already otherwise containing a Internet gateway application for routing information through an SMTP gateway. Moreover, the MDC allows content providers to continue with their current mode of operation without placing the carrier's network at risk. The MDC can receive messages using a variety of protocols, including SMTP. It automatically routes messages to the appropriate carrier based on MIN range. Instead of delivering SMTP content directly to the carrier, it is delivered to the MDC. The MDC then ensures that the content is delivered in a 'carrier-friendly' manner.

MDC can provide the Info Provider with delivery statistics, e.g., what percentage of messages are being delivered.

The MDC helps prevent the carrier from being overwhelmed by bulk messaging content and provides the following benefits:

- bulk message traffic is distributed across time
- messages are delivered over more efficient protocols than SMTP through the carrier's Wireless Internet Gateway
- messages are only delivered when handsets are on, thereby eliminating network storage and retries
- messages are delivered with appropriate urgency, delivery receipt, expiration times, and billing identifiers
- individual bulk message queues allow the carrier to limit the number of messages that can be queued per subscriber
- bulk messaging can be disabled for individual accounts when subscribers churn
- bulk message delivery statistics are available to the carrier via a web interface.

While the invention has been described with reference to the exemplary embodiments thereof, those skilled in the art will be able to make various modifications to the described embodiments of the invention without departing from the true spirit and scope of the invention.

What is claimed is:

1. A message distribution center, comprising:
    a receiver to receive a given short message from a short message source device;
    a plurality of subscriber queues storing short messages, including one of said plurality of subscriber queues storing said given short message, before delivery to a wireless carrier's subscriber message delivery network;
    an automatic deletion module to automatically delete a short message from at least one of said plurality of subscriber queues when a maximum threshold associated with said one of said plurality of subscriber queues is exceeded, said maximum threshold being determined according to a delivery statistic; and
    a transmitter to transmit said given short message to said wireless carrier's subscriber message delivery network.

2. The message distribution center according to claim 1, further comprising:
    an assignment module to individually assign each of said plurality of subscriber queues a maximum number of short messages that each of said plurality of subscriber queues can store.

3. The message distribution center according to claim 1, further comprising:
    at least one of an RMI communication interface and an SMPP communication interface to transmit said queued short message.

4. The message distribution center according to claim 1, wherein:
    said plurality of subscriber queues each correspond to a different subscriber in said wireless carrier's subscriber message delivery network.

5. The message distribution center according to claim 1, wherein:
    each of said plurality of subscriber queues operates in a first in-first out fashion.

6. The message distribution center according to claim 1, wherein:
    said wireless carrier's subscriber message delivery network is a wireless intelligent network (WIN).

7. A method of delivering a short message with a message distribution center, comprising:
    receiving a given short message from a short message source device;
    storing said given short message in at least one of a plurality of subscriber queues before delivery to a wireless carrier's subscriber message delivery network;
    automatically deleting a short message from at least one of said plurality of subscriber queues when a maximum threshold associated with said one of said plurality of subscriber queues is exceeded, said maximum threshold being determined according to a delivery statistic; and
    transmitting said given short message to said wireless carrier's subscriber message delivery network.

8. The method of delivering a short message with a message distribution center according to claim 7, further comprising:
    individually assigning to each of said plurality of subscriber queues, with an assignment module, a maximum number of short messages that each of said plurality of subscriber queues can store.

9. The method of delivering a short message with a message distribution center according to claim 7, further comprising:
    transmitting said queued short message with at least one of an RMI communication interface and an SMPP communication interface.

10. The method of delivering a short message with a message distribution center according to claim 7, wherein:
    said plurality of subscriber queues each corresponding to a different subscriber device in said wireless carrier's subscriber message delivery network.

11. The method of delivering a short message with a message distribution center according to claim 7, further comprising:
    operating each of said plurality of subscriber queues in a first in-first out fashion.

12. The method of delivering a short message with a message distribution center according to claim 7, wherein:
    said wireless carrier's subscriber message delivery network is a wireless intelligent network (WIN).

* * * * *